(12) United States Patent
Alexander et al.

(10) Patent No.: US 11,351,923 B2
(45) Date of Patent: Jun. 7, 2022

(54) MASKED FABRICATION INFLATABLE DEVICES

(71) Applicants: GM GLOBAL TECHNOLOGY OPERATIONS LLC, Detroit, MI (US); THE REGENTS OF THE UNIVERSITY OF MICHIGAN, Ann Arbor, MI (US)

(72) Inventors: Paul W. Alexander, Ypsilanti, MI (US); Wonhee M. Kim, Royal Oak, MI (US); Jonathan E. Luntz, Ann Arbor, MI (US); Diann Brei, Milford, MI (US); Laura Alejandra Giner Munoz, Ann Arbor, MI (US); Boyu Wan, Ann Arbor, MI (US); Paul Q. Powers, Victoria, TX (US); Patrick K. Kenney, Pleasant Prairie, WI (US); Koray Benli, Ann Arbor, MI (US)

(73) Assignees: GM GLOBAL TECHNOLOGY OPERATIONS LLC, Detroit, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 15 days.

(21) Appl. No.: 16/704,764

(22) Filed: Dec. 5, 2019

(65) Prior Publication Data
US 2021/0170951 A1 Jun. 10, 2021

(51) Int. Cl.
*B60R 7/00* (2006.01)
*B29C 65/18* (2006.01)
(Continued)

(52) U.S. Cl.
CPC .............. *B60R 7/005* (2013.01); *A47C 7/622* (2018.08); *B29C 65/18* (2013.01); *B29C 66/45* (2013.01);
(Continued)

(58) Field of Classification Search
None
See application file for complete search history.

(56) References Cited

U.S. PATENT DOCUMENTS 4,803,029 A * 2/1989 Iversen .................. B29C 65/02
264/264
5,123,987 A * 6/1992 Mattia ................. B29C 65/7894
156/230

(Continued)

FOREIGN PATENT DOCUMENTS

EP 2689974 A1 * 1/2014 ......... B29C 65/5057

OTHER PUBLICATIONS

Luntz, Jonathan et al. "Functional Exploration of Constrained-Layer Inflatable Active Architectures". University of Michigan and General Motors; SMASIS 2018; Sep. 12, 2018; 22 pages.

(Continued)

*Primary Examiner* — Francisco W Tschen
*Assistant Examiner* — Abhishek A Patwardhan

(57) ABSTRACT

A multi-layer bladder includes: a first bladder layer; a mask including a plurality of apertures; a second bladder layer bonded to the first bladder layer within the apertures in the mask and where the mask is not present between the first and second bladder layers, where the mask is configured to prevent bonding of the second bladder layer to the first bladder layer where the mask is present; and a fluid channel that is located between the first and second bladder layers and that extends to the mask from an outer edge of the multi-layer bladder.

18 Claims, 23 Drawing Sheets

(51) Int. Cl.
    *A47C 7/62*         (2006.01)
    *B60N 2/90*        (2018.01)
    *B29C 65/00*      (2006.01)
    *B29L 31/44*      (2006.01)

(52) U.S. Cl.
    CPC ........ *B60N 2/914* (2018.02); *B29L 2031/443* (2013.01)

(56) References Cited

U.S. PATENT DOCUMENTS

| | | | | |
|---|---|---|---|---|
| 5,514,431 | A * | 5/1996 | Shimomura | B29C 65/02 428/35.3 |
| 7,328,472 | B2 * | 2/2008 | Chaffee | A47C 7/021 5/706 |
| 9,005,847 | B2 * | 4/2015 | Rock | H01M 8/0267 429/535 |

OTHER PUBLICATIONS

Alexander, Paul, Dr. et al. "Sub-Dermal Distributed Pneumatic Skin". Multifunctional Vehicle Systems. University of Michigan and General Motors. Dec. 6, 2018; 21 pages.

* cited by examiner

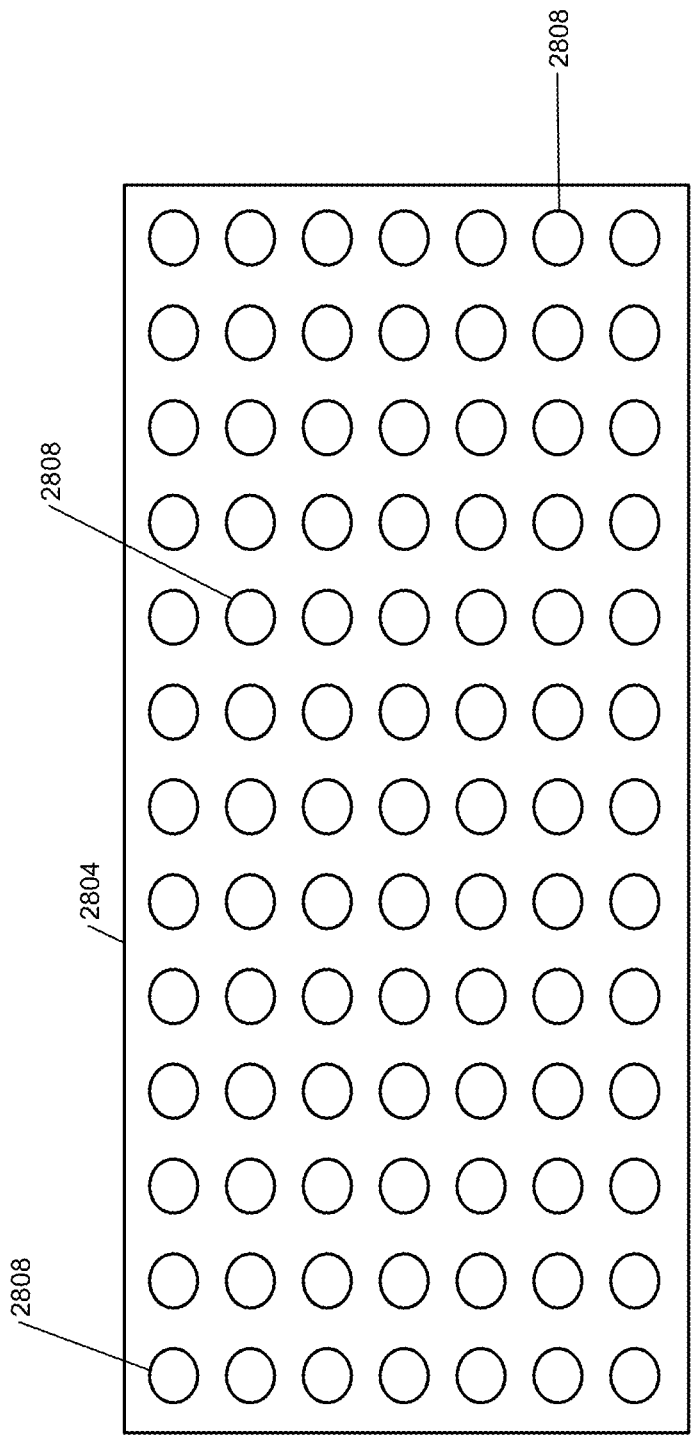
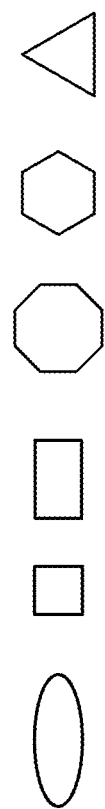
FIG. 28

MASKED FABRICATION INFLATABLE DEVICES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to pneumatic membranes and more particularly to masked multi-layer bladders.

Pneumatic bladders are inflatable bladders and may have numerous different applications. Pneumatic bladders may be inflated with air or another suitable gas. One type of bladder includes internal threads attached to opposing sides of the bladder. As the bladder is inflated, the pressure within the bladder causes the bladder to expand outward and thereby applies tension to the threads, which in turn limit expansion of the bladder. In addition to limiting expansion of the bladder, the threads increase the amount of compressive load that the bladder may withstand before the bladder deforms due to the compressive load.

SUMMARY

In a feature, a multi-layer bladder includes: a first bladder layer; a mask including a plurality of apertures; a second bladder layer bonded to the first bladder layer within the apertures in the mask and where the mask is not present between the first and second bladder layers, where the mask is configured to prevent bonding of the second bladder layer to the first bladder layer where the mask is present; and a fluid channel that is located between the first and second bladder layers and that extends to the mask from an outer edge of the multi-layer bladder.

In further features, the apertures are equidistant from each other.

In further features, the a slit is provided through the first and second bladder layers, the multi-layer bladder is sealed along the slit, and a portion of the mask is proximate to the slit.

In further features, the multi-layer bladder does not include any slits through the first and second bladder layers.

In further features, the first and second bladder layers include polypropylene.

In further features, the first and second bladder layers include thermoplastic polyurethane (TPU).

In further features, the mask includes a paper.

In further features, the mask includes glassine.

In further features, at least a portion of the second bladder layer is more resilient than the first bladder layer.

In further features, the multi-layer bladder further includes: a second mask; and a third bladder layer bonded to the second bladder layer where the second mask is not present between the third and second bladder layers, where the second mask is configured to prevent bonding of the second bladder layer to the third bladder layer where the second mask is present.

In further features, the second bladder layer comprises at least gas channel that allows fluid flow from between the first and second bladder layers to between the second and third bladder layers.

In further features, a second fluid channel is located between the second and third bladder layers and that extends to the second mask from the outer edge of the multi-layer bladder.

In further features, the apertures are circular.

In further features, the apertures are non-circular.

In a feature, a seatback pocket includes the multi-layer bladder.

In further features, the multi-layer bladder further includes: a second mask; and a third bladder layer bonded to the second bladder layer where the second mask is not present between the third and second bladder layers, where the second mask is configured to prevent bonding of the second bladder layer to the third bladder layer where the second mask is present.

In further features, a second multi-layer bladder that is arranged perpendicular to the multi-layer bladder.

In further features, an extensible fabric covers the multi-layer bladder.

In further features, a first tab is located at a first distal end of the multi-layer bladder and a second tab is located at a second distal end of the multi-layer bladder, where the first distal end is opposite the second distal end, and where the first and second tabs are at least partially disposed within channels in the seatback.

In a feature, a method of manufacturing a multi-layer bladder includes: disposing a mask on a first bladder layer; disposing a second bladder layer over the mask and the first bladder layer, where the mask includes a plurality of apertures and is configured to prevent bonding of the second bladder layer to the first bladder layer where the mask is present; and using a heat press, applying pressure and heating the first bladder layer, second bladder layer, and the mask within in a predetermined temperature range for at least a predetermined period, thereby bonding the first bladder layer with the second bladder layer within the apertures and at locations where the mask is not present between the first and second bladder layers.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 28 is a perspective view of an example mask with perforations where the material of the mask is removed;

In the drawings, reference numbers may be reused to identify similar and/or identical elements.

DETAILED DESCRIPTION

Creating complex bladders with multiple interconnected membrane layers can be difficult and time consuming. Such bladders can be created, for example, using a linear heat sealing process. Such bladders can be costly or impossible to make with perimeter sealing processes, such as ultrasonic welding.

The present application involves manufacturing masked multi-layer bladders efficiently and cost effectively. The multi-layer bladders may include subdermal gas delivery systems where the mask (between bladder layers) includes apertures to more equally distribute gas flow. The multi-layer bladders discussed herein can be used, for example, in heating ventilation and air conditioning (HVAC) systems of vehicles, seatback pockets of vehicles, and in other implementations.

Figure 1:
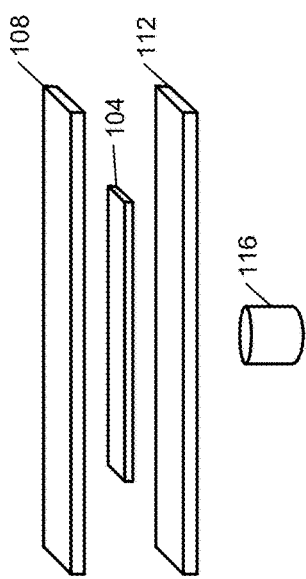
FIG. 1 is an exploded view of an example two layer masked bladder.

FIG. 1 is an exploded view of an example two layer masked bladder. A mask 104 is sandwiched between a first membrane 108 and a second membrane 112. The first membrane 108 is bonded to the second membrane 112 at locations other than where the mask 104 is located. An inlet 116 is inserted through the second membrane 112 such that fluid (e.g., gas, such as air, or a liquid, such as a saline solution) can flow into space where the first and second membranes 108 and 112 are not bonded together due to the presence of the mask 104. Gas within the space causes the first and/or second membranes 108 and 112 to expand and inflate the bladder at the location of the mask 104.

The first and second membranes 108 and 112 may be, for example polyethylene (e.g., 0.004" thickness sheets, 0.006" thickness sheets), thermoplastic polyurethane (TPU) (e.g., 0.2" thickness sheets, 0.3" thickness sheets), or another suitable material. The mask 104 may be, for example, one or more layers of paper (e.g., standard white paper), one or more layers of glassine paper, or one or more layers of another suitable material that does not bond to the membranes used. Polyethylene may be used as the mask 104 in examples where the first and second membranes 108 and 112 are another type of material.

Figure 3:
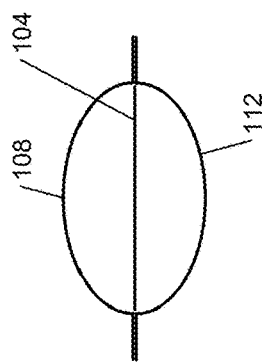
FIG. 3 is an example inflated view of the example bladder of FIG. 1.
Figure 2:
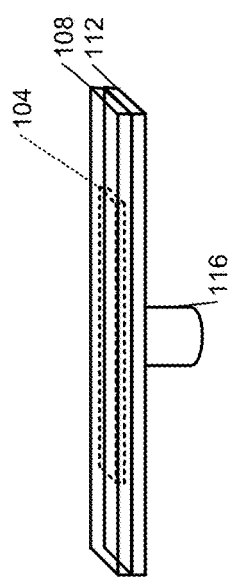
FIG. 2 is an example non-inflated view of the example bladder of FIG. 1.

FIG. 2 is an example non-inflated view of the example bladder of FIG. 1. FIG. 3 is an example inflated view of the example bladder of FIG. 1.

Figure 4:
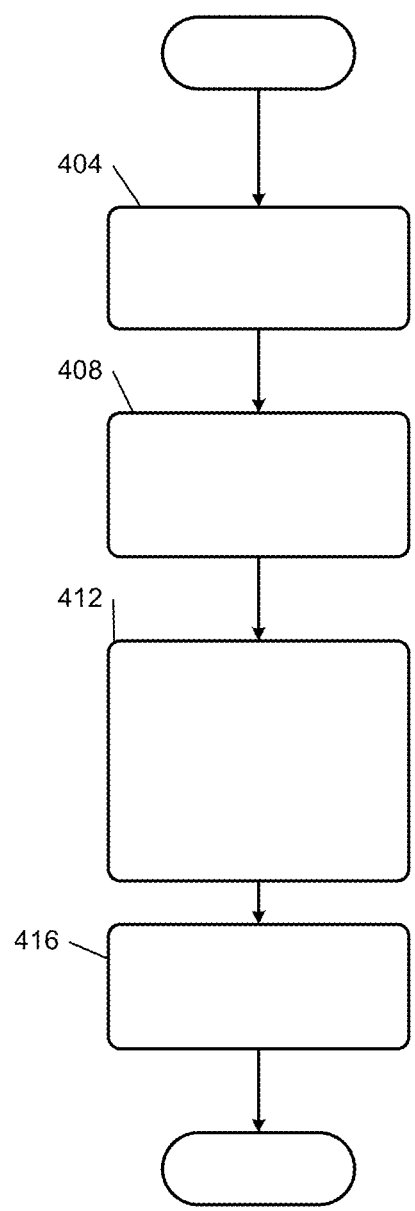
FIG. 4 is a flowchart depicting an example method of manufacturing a two-layer masked bladder.

FIG. 4 is a flowchart depicting an example method of manufacturing a two-layer masked bladder. The method begins with 404 where the first membrane 108, the second membrane 112, and the mask 104 are prepared. The mask 104 and the first and second membranes 112 and 108 may, for example, be cut to predetermined dimensions and to have a predetermined shape. The mask 104 may be cut into a predetermined pattern, such as described further below. The first and second membranes 108 and 112 and the mask 104 may be cut, for example, using an automated cutting machine or in another suitable manner. The mask may include one or more portions configured to extend to one or more outer edges of the bladder, for example, for insertion of the inlet, an outlet, etc. Inlets may also serve as outlets. Inlets and outlets may be referred to more generally as gas or fluid channels.

At 408, the mask 104 may be positioned on top of the first membrane 108. The second membrane 112 is positioned on top of the mask 104 such that the mask 104 is sandwiched between the first membrane 108 and the second membrane 112.

At 412, the first membrane 108, the second membrane 112, and the mask 104 are positioned on a heat press. The heat press is closed to apply pressure and heat to the first membrane 108, the second membrane 112, and the mask 104. The first membrane 108, the second membrane 112, and the mask 104 may be heated at a predetermined temperature for a predetermined period using the heat press. The predetermined temperature and the predetermined period may be set, for example, based on being sufficient to bond the first membrane 108 to the second membrane 112. For example only, the predetermined temperature may be approximately 270 degrees Fahrenheit (F) to approximately 330 degrees F., and the predetermined period may be 45 seconds to 2 minutes using the example materials above. Other temperatures and/or periods may be used for different materials and or materials of different characteristics. The heating and the pressure bond (seal) the first membrane 108 and the second membrane 112.

At 416, the inlet 116 (e.g., a tube) may be inserted through one of the first and second membranes 108 and 112 (or between the first and second membranes 108 and 112). In various implementations, an outlet (e.g., a tube) may also be inserted through one of the first and second membranes 108 and 112 (or between the first and second membranes 108 and 112). Seals may be formed around the inlet 116, for example, using a hand iron or another suitable form of heat sealing. In various implementations, such as discussed further below, multiple inlets may be provided between membranes.

Figure 5:
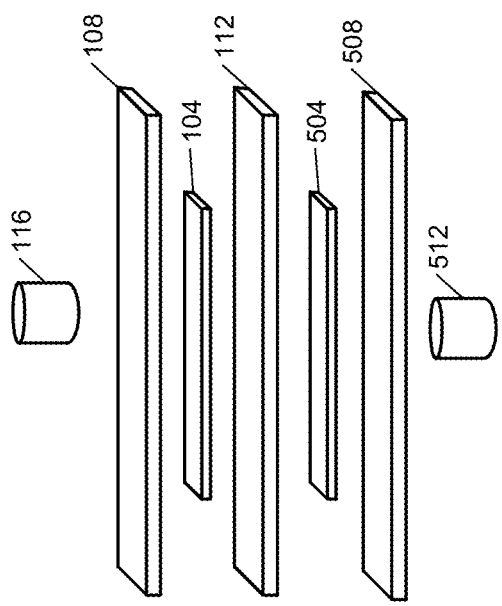
FIG. 5 is an exploded view of an example three layer masked bladder.

While FIGS. 1-3 illustrate an example of a two layer bladder, the present application is also applicable to greater than two layer bladders. For example, FIG. 5 is an exploded view of an example three layer masked bladder. The mask 104 is sandwiched between the first membrane 108 and the second membrane 112. The first membrane 108 is bonded to the second membrane 112 at locations other than where the mask 104 is located. In this example, the second membrane 112 may be more resilient than the first membrane 108. For example, the second membrane 112 may be thicker than the first membrane 108 or be a material that is more resilient (less deformable/flexible) than the material of the first membrane 108.

A second mask 504 is sandwiched between the second membrane 112 and a third membrane 508. The second membrane 112 is bonded to the third membrane 508 at locations other than where the second mask 504 is located.

A second inlet 512 is inserted through the third membrane 508 such that gas (e.g., air) can flow into space where the second and third membranes 112 and 508 are not bonded together due to the presence of the second mask 504. Gas within the space causes the second and/or third membranes 112 and 508 to expand and inflate the bladder.

The third membrane 508 may be, for example polyethylene (e.g., 0.004" thickness sheets, 0.006" thickness sheets), thermoplastic polyurethane (TPU) (e.g., 0.2" thickness sheets, 0.3" thickness sheets), or another suitable material. The second mask 504 may be, for example, paper (e.g., standard white paper), glassine paper, or another suitable material that does not bond to the membranes used. Polyethylene may be used as the second mask 504 in examples where the second and third membranes 112 and 508 are another type of material.

In addition to the steps described of FIG. 4, after the heat pressing, the bladder may be flipped over, and the second mask 504 may be positioned on top of the second membrane 112. The third membrane 508 is positioned on top of the second mask 504 such that the second mask 504 is sandwiched between the second membrane 112 and the third membrane 508.

The first membrane 108, the second membrane 112, the third membrane 508, the first mask 104, and the second mask 504 are positioned on the heat press. The heat press is closed to apply pressure and heat to the second membrane 112 and the third membrane 508. The first membrane 108, the second membrane 112, the third membrane 508, the first mask 104, and the second mask 504 may be heated at the predetermined temperature for the predetermined period using the heat press. The heating and the pressure bond (seal) the second membrane 112 and the third membrane 508.

The second inlet 512 (e.g., a tube) may be inserted through one of the second and third membranes 112 and 508 (or between the second and third membranes 112 and 508). In various implementations, an outlet (e.g., a tube) may also be inserted through one of the second and third membranes 112 and 508 (or between the second and third membranes 112 and 508).

Figure 6:
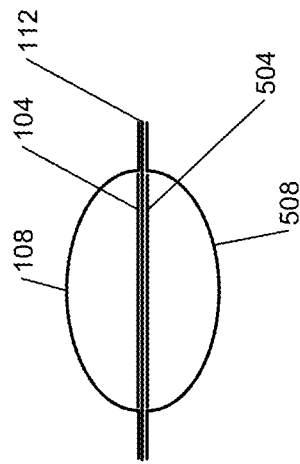
FIG. 6 is a side view of example inflation of the example bladder of FIG. 5 in a first and second directions.
Figure 7:
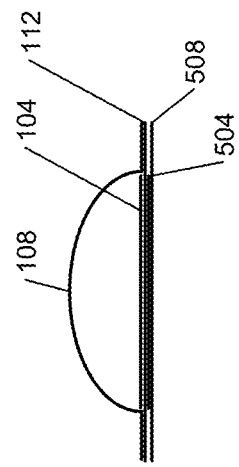
FIG. 7 is a side view of example inflation of the example bladder of FIG. 5 in a first direction.
Figure 8:
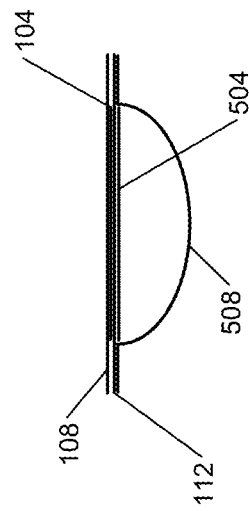
FIG. 8 is a side view of example inflation of the example bladder of FIG. 5 in a second direction.

In operation, gas may be supplied to between the first and second membranes 108 and 112 to inflate the bladder in a first direction. Gas may be supplied to between the second and third membranes 112 and 508 to inflate the bladder in a second direction. The inflation may be simultaneous or at different times. FIG. 6 includes a side view of example inflation of the example bladder of FIG. 5 in the first and second directions. FIG. 7 includes a side view of example inflation of the example bladder of FIG. 5 in the first direction. FIG. 8 includes a side view of example inflation of the example bladder of FIG. 5 in the second direction.

As discussed above, the mask may be shaped to a predetermined pattern. The pattern of the mask of a bladder may allow the bladder to bend. The pattern of the mask may dictate the shape of the bending.

Figure 9:
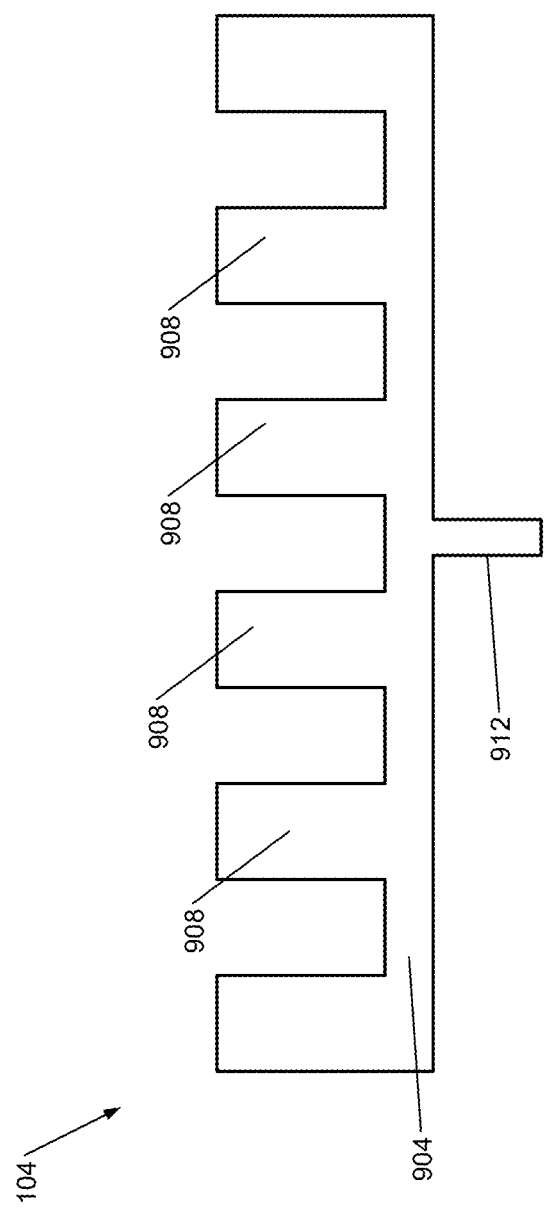
FIG. 9 is a top view of an example mask having a predetermined pattern.

FIG. 9 includes a top view of the mask 104 having a predetermined pattern. The mask 104 may include a first section 904 and a plurality of second sections 908 that extend away from (e.g., perpendicular to) the first section 904. Dimensions of the first section 904 and 908 dictate the shape that the bladder will bend when air is input to the bladder. An inlet section 912 may extend to the outer edges of the first and second membranes such that the inlet 116 can be inserted into the inlet section 912.

Figure 10:
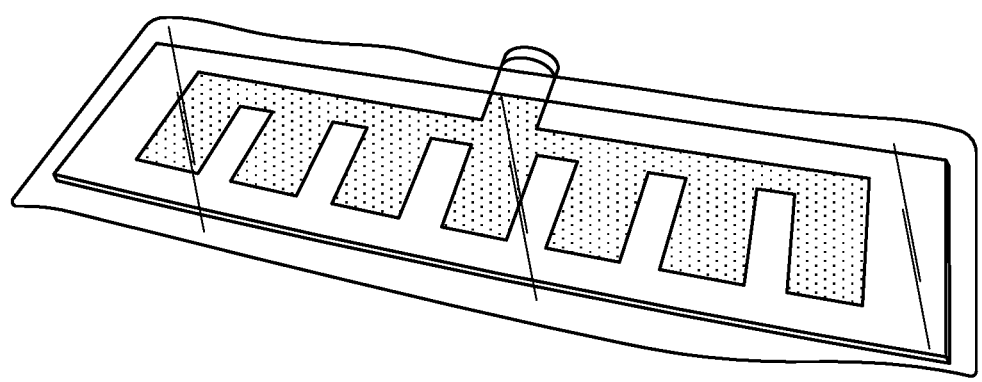
FIG. 10 is a perspective view of an example bladder having a mask similar to the mask of FIG. 9.
Figure 11:
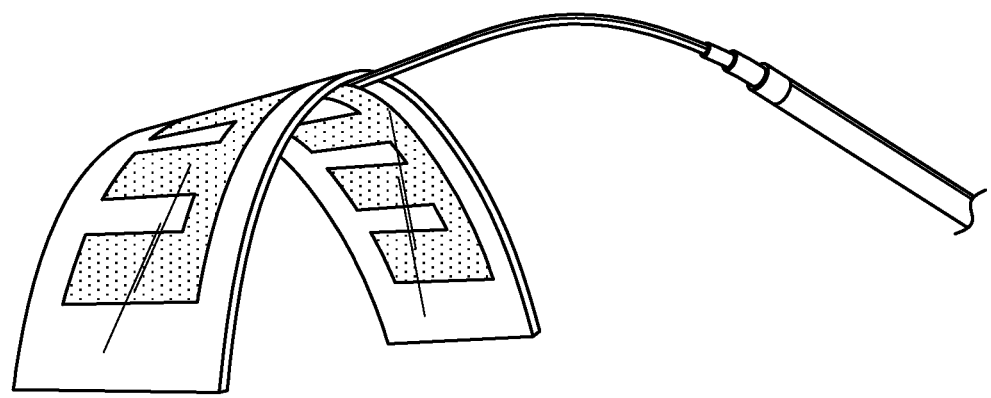
FIG. 11 includes a perspective view of the example bladder of FIG. 10 once inflated.
Figure 12:
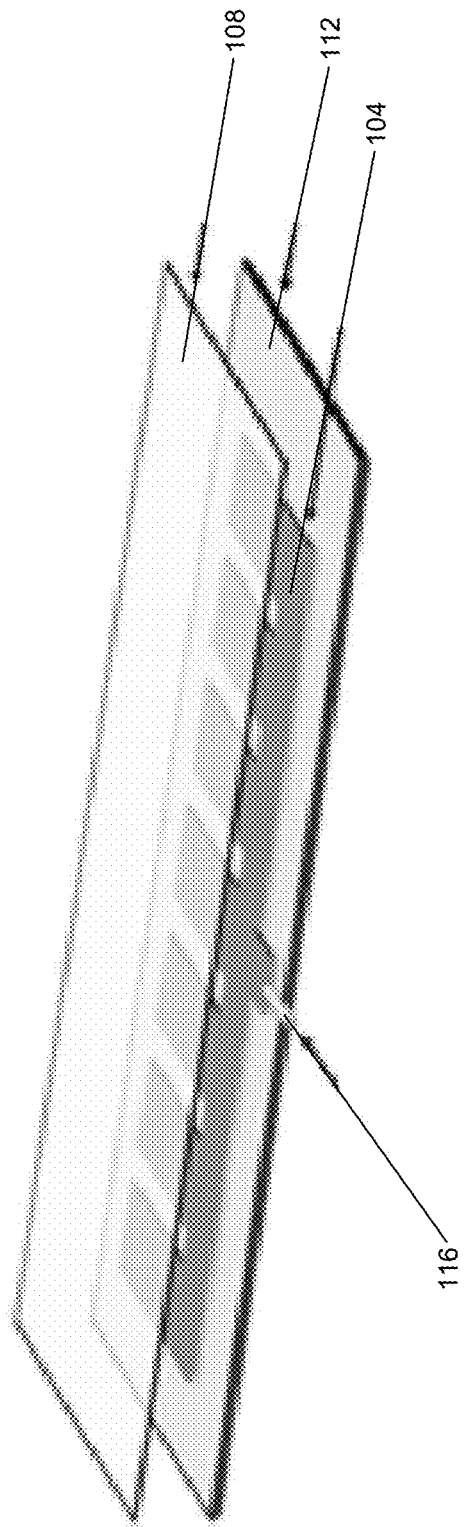
FIG. 12 is an exploded view of the example bladder of FIGS. 10 and 11.

FIG. 10 is a perspective view of an example bladder having a mask similar to the mask of FIG. 9. As stated above, the pattern of the mask (and also the resiliencies of the first and second membranes 108 and 112) dictates the shape of the bending of the bladder once inflated. FIG. 11 includes a perspective view of the example bladder of FIG. 10 once inflated. As shown in FIG. 11, the mask including the first section (e.g., 904) and the second sections (e.g., 908) causes the bladder to arch when inflated. FIG. 12 is an exploded view of the example bladder of FIGS. 10 and 11.

Figure 13:
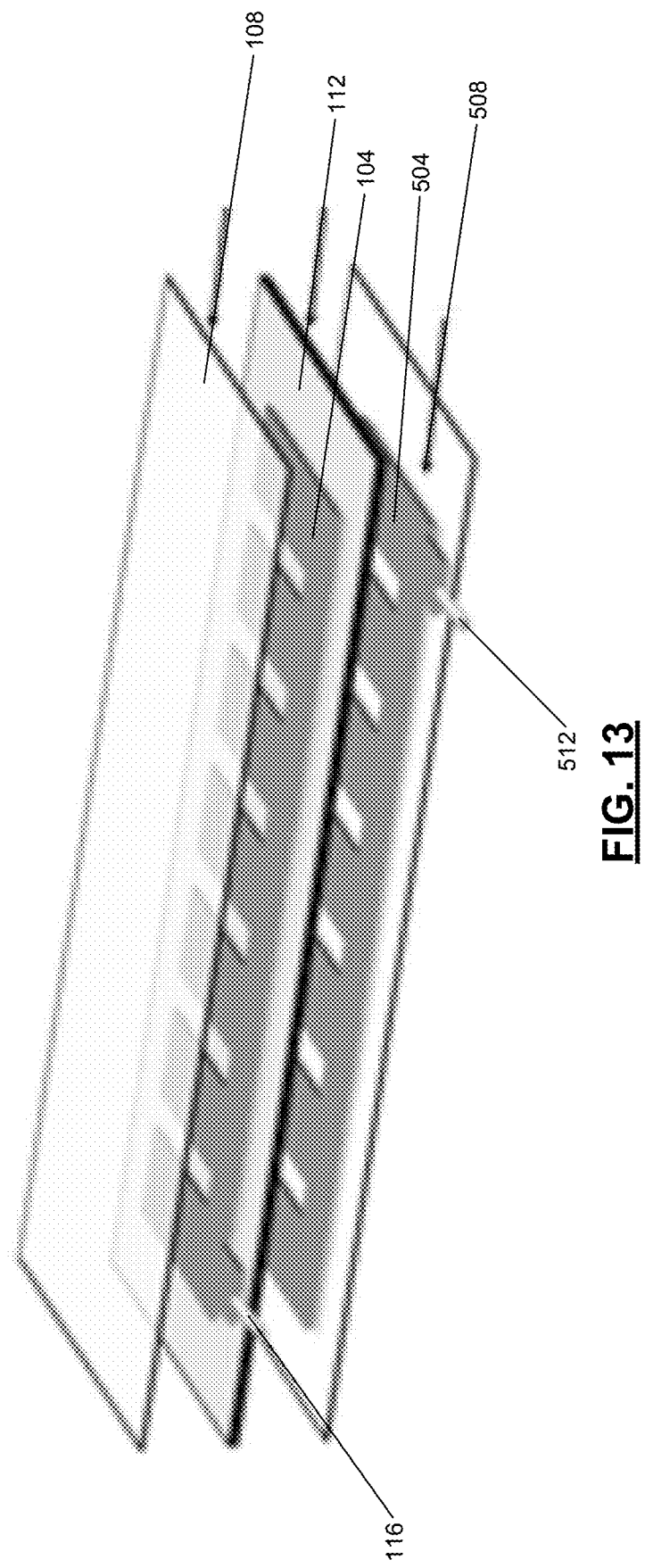
FIG. 13 includes an exploded view of an example bladder including two masks patterned similarly to the example masks of FIGS. 9-12.
Figure 14:
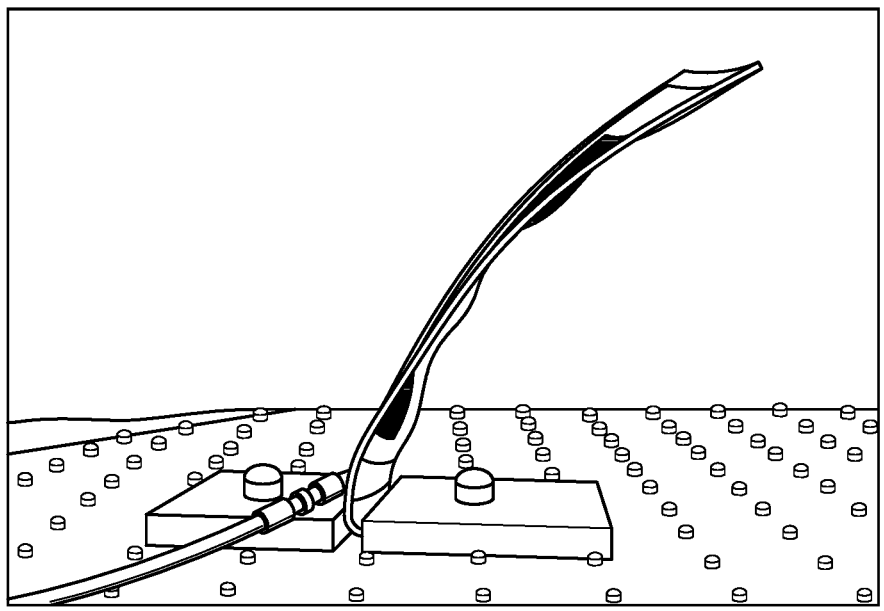
FIG. 14 includes a side view including example bending of the bladder of FIG. 13 in a first direction.
Figure 15:
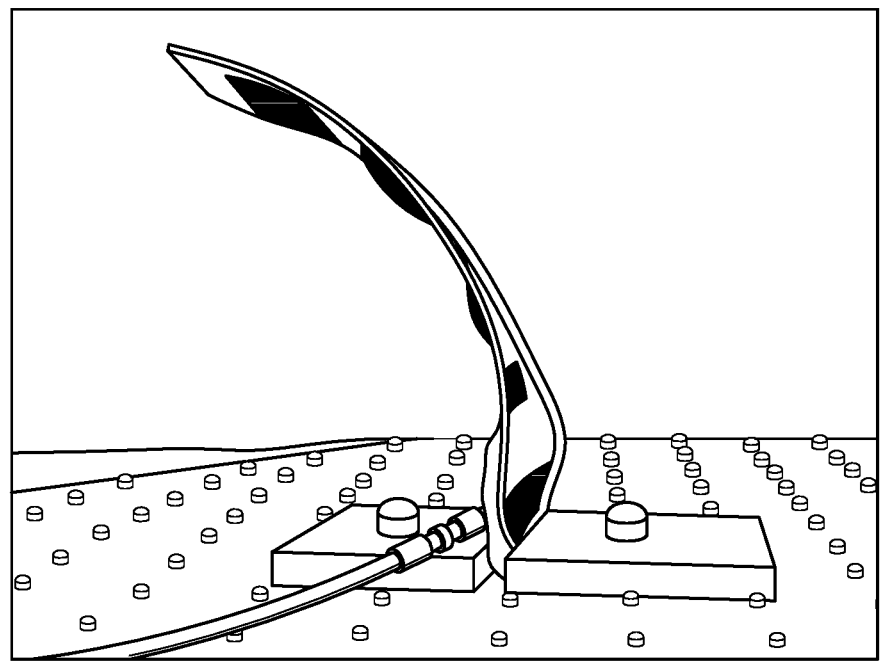
FIG. 15 includes a side view including example bending of the bladder of FIG. 13 in a second direction.

As stated above, the bladder can include more than two membranes and more than one mask as to deform in multiple directions. FIG. 13 includes an exploded view of an example bladder including two masks patterned similarly to the example masks of FIGS. 9-12. This arrangement allows the bladder to bend in a first direction when pressure is applied between the first and second membranes and in a second direction when pressure is applied between the second and third membranes. FIG. 14 includes a side view including example bending of the bladder of FIG. 13 in the first direction. FIG. 15 includes a side view including example bending of the bladder of FIG. 13 in the second direction.

In various implementations, two or more bladders may be used together to perform one or more functions. For example, two or more bladders may be implemented together in a vehicle to perform one or more functions. As an example, two bladders may be arranged in a T-shape and used with a seat back pocket of a vehicle.

Figure 16:
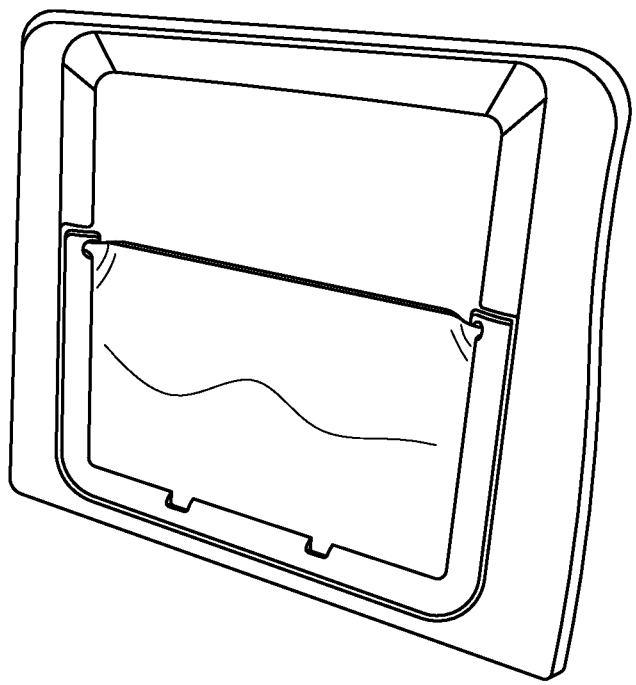
FIG. 16 includes a perspective view of an example seatback pocket of a vehicle.

FIG. 16 includes a perspective view of an example seatback pocket of a vehicle. The seatback pocket is secured to a back of a first seat of a vehicle as to be accessible from behind the first seat, such as by an occupant sitting on a second seat behind the first seat.

Figure 17:
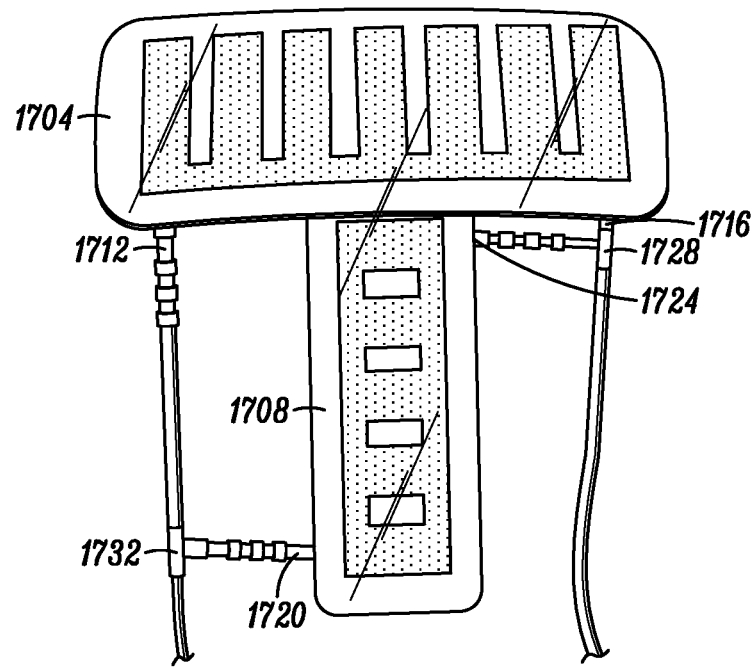
FIG. 17 includes a top view of an example view of two masked bladders used in a seatback pocket of a vehicle.

FIG. 17 includes a top view of an example view of two masked bladders used in a seatback pocket of a vehicle. A first bladder 1704 is similar or identical to the example of FIG. 13 as to be able to bend in two directions. The first bladder 1704 is arranged horizontally (left to right) across a top of the seatback pocket.

A second bladder 1708 is arranged perpendicular to the first bladder 1704. The first and second bladders 1704 and 1708 therefore form a T-shape. The second bladder 1708 may include three membranes and two masks similar to the example of FIG. 13 (but with different mask patterns) as to be able to bend in two directions. The membranes of the first and second bladders 1704 and 1708 may be bonded (sealed) together (e.g., via heat pressing). The second bladder 1708 is arranged to extend vertically (top to bottom) toward a bottom of the seatback pocket.

In this example, the first bladder 1704 includes a first inlet 1712 and a second inlet 1716. The second bladder 1708 includes a third inlet 1720 and a fourth inlet 1724. Gas can be supplied via the first inlet 1712 to cause the first bladder 1704 to bend in a first direction. Gas can be supplied via the second inlet 1716 to cause the first bladder 1704 to bend in a second direction. Gas can be supplied via the third inlet 1720 to cause the second bladder 1708 to bend in the first direction. Gas can be supplied via the fourth inlet 1724 to cause the second bladder 1708 to bend in the second direction or the first direction.

Gas may be supplied to the second bladder 1708 from a separate gas source than the gas source used to supply gas to the first bladder 1704. Alternatively, gas from the same gas source may be used to supply gas to both the first bladder 1704 and the second bladder 1708. In the example of FIG. 17, gas from one gas source is supplied concurrently to both the second bladder 1708 (via the fourth inlet 1724) and the first bladder (via the second inlet 1716) via a T 1728. In this manner, the first and second bladders 1704 and 1708 will both deform in the first direction at the same time. Gas from one gas source is supplied concurrently to both the second bladder 1708 (via the third inlet 1720) and the first bladder (via the first inlet 1712) via a T 1732. In this manner, the first and second bladders 1704 and 1708 will both deform in the second direction at the same time. Supplying no gas to the first bladder 1704 or the second bladder 1708 provides a neutral operation.

Figure 18:
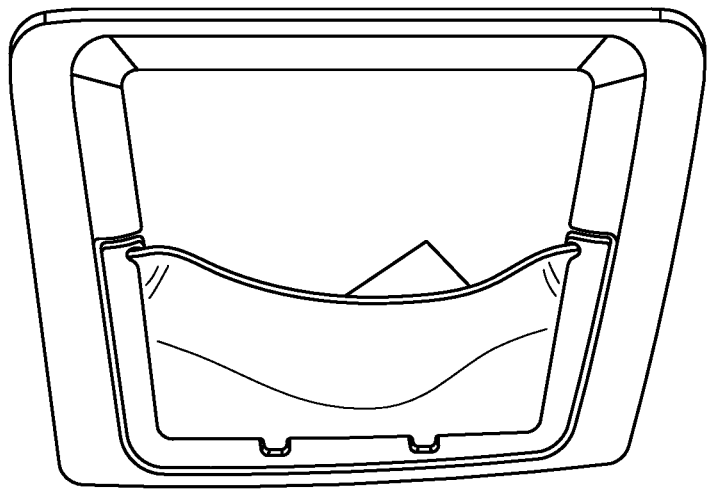
FIG. 18 is an example illustration of the seatback pocket being opened by the bending of a bladder in a first direction to hold the seatback pocket open.
Figure 19:
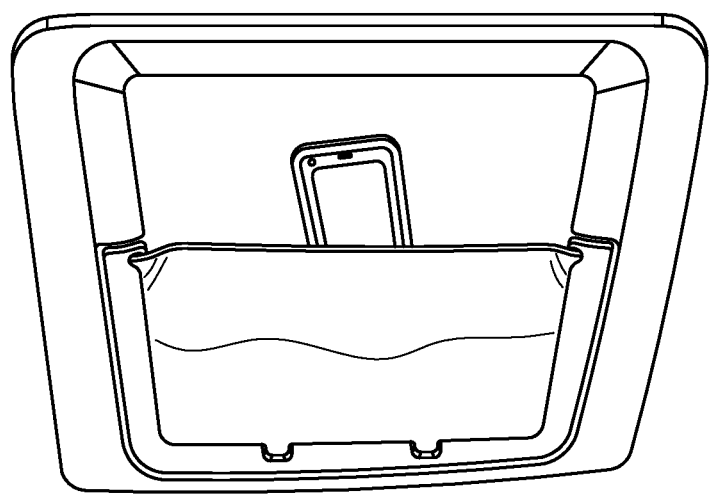
FIG. 19 is an example illustration of the seatback pocket being held closed by the bending of a bladder in a second direction to cinch the seatback pocket closed.
Figure 20:
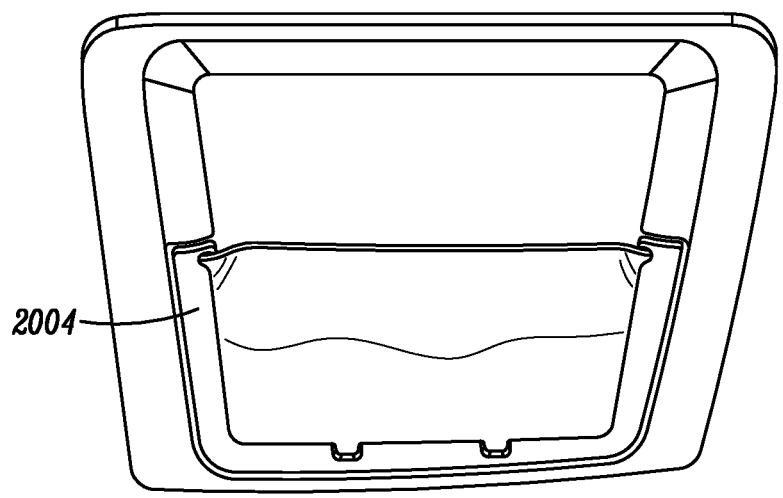
FIG. 20 is an example illustration of the seatback pocket in a neutral position.

When the first and second bladders 1704 and 1708 bend in the first direction, the seatback pocket may open and allow items to be inserted into the seatback pocket. FIG. 18 is an example illustration of the seatback pocket being opened by the bending of the first and second bladders 1704 and 1708 in a first direction to hold the seatback pocket open. When the first and second bladders 1704 and 1708 bend in the second direction, the seatback pocket may close and cinch the seatback pocket, such as to retain any items inserted within the seatback pocket. FIG. 19 is an example illustration of the seatback pocket being held closed by the bending of the first and second bladders 1704 and 1708 in a second direction to cinch the seatback pocket closed. When gas is not supplied to either of the first and second bladders 1704 and 1708, the seatback pocket may remain in a neutral position. FIG. 20 is an example illustration of the seatback pocket in a neutral position.

Figure 21:
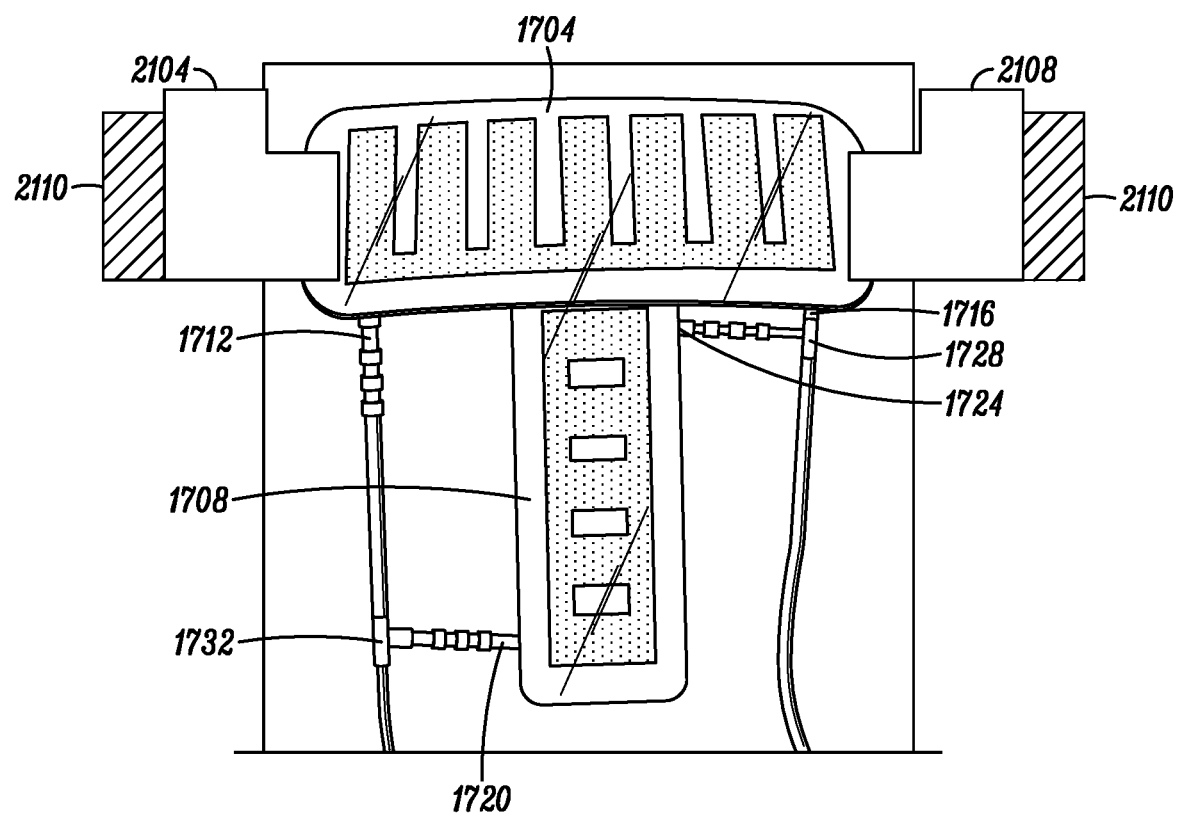
FIG. 21 is a perspective view of bladders used in a seatback pocket with tabs.

The first and second bladders 1704 and 1708 may be wrapped in a stretchable or extensible fabric material to provide a finished appearance and accommodate actuation, such as in the examples of FIGS. 18-20. As shown in FIG. 21, tabs 2104 and 2108 may be attached to the seat back as illustrated by 2110 and overlap the distal ends of the first and second bladders 1704 and 1708. The tabs 2104 and 2108 may be retained under a clip (e.g., 2004 in FIG. 20) that holds the seatback pocket to the seat. The tabs 2104 and 2108 may help retain the first bladder 1704 in place within the seatback pocket while allowing the first and second bladders 1704 and 1708 to actuate the seatback pocket as desired. In particular the tabs 2104 and 2108 provide a reaction surface to push against when cinching while allowing the ends to slide which accommodates sliding of the bladder ends during deformation. The movement may be horizontal and vertical. The tabs 2104 and 2108 may be, for example, a plastic (e.g., acrylonitrile butadiene styrene (ABS) plastic) or another suitable material.

Figure 22:
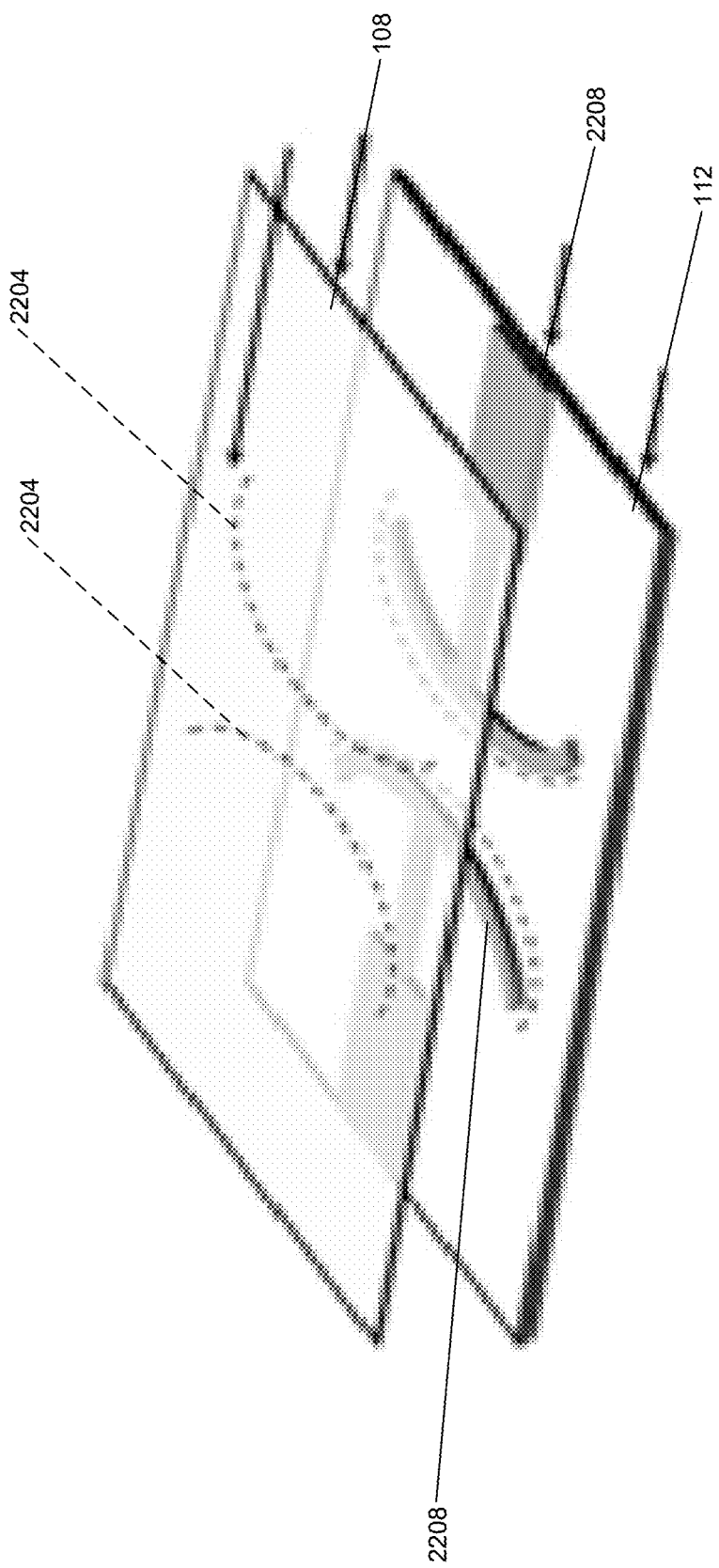
FIG. 22 is an exploded view of an example two layer masked bladder including slits near multiple masks.
Figure 23:
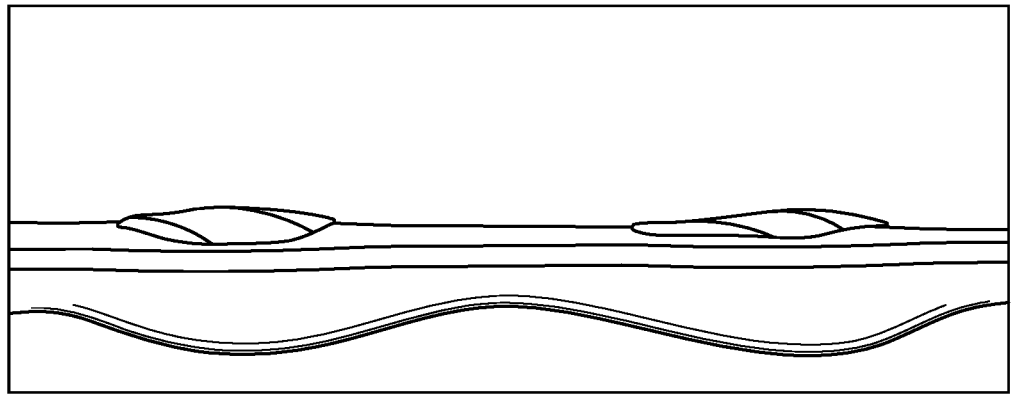
FIG. 23 is an example side view of the bladder of FIG. 21 when the gills are not inflated.
Figure 24:
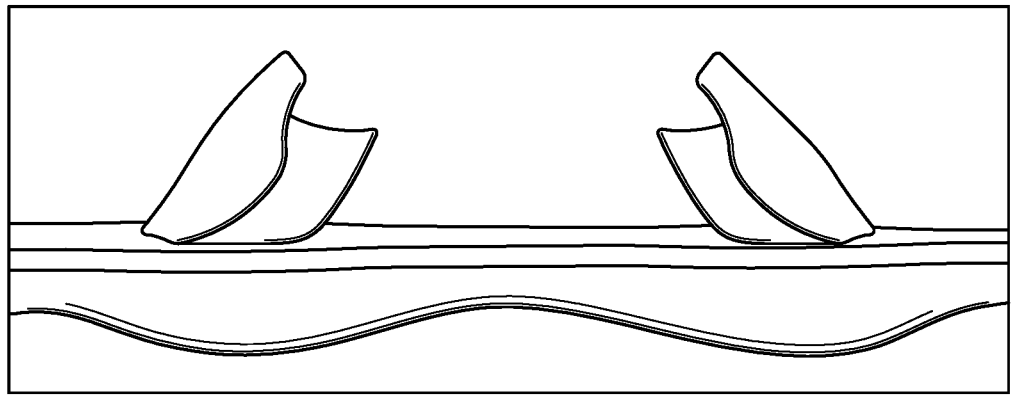
FIG. 24 is an example side view of the bladder of FIG. 21 when the gills are inflated.

In various implementations, one or more slits may be made in one or more membranes to create features similar to gills of fish. FIG. 22 is an exploded view of an example two layer masked bladder including slits 2204 near multiple masks 2208. In this example, the slits 2204 are through both the first membrane 108 and the second membrane 112. Edges of the slits 2204 are sealed, such as after the slits 2204 are made. FIG. 23 is an example side view of the multi-layer bladder of FIG. 21 when the gills are not inflated. FIG. 24 is an example side view of the multi-layer bladder of FIG. 21 when the gills are inflated.

Figure 25:
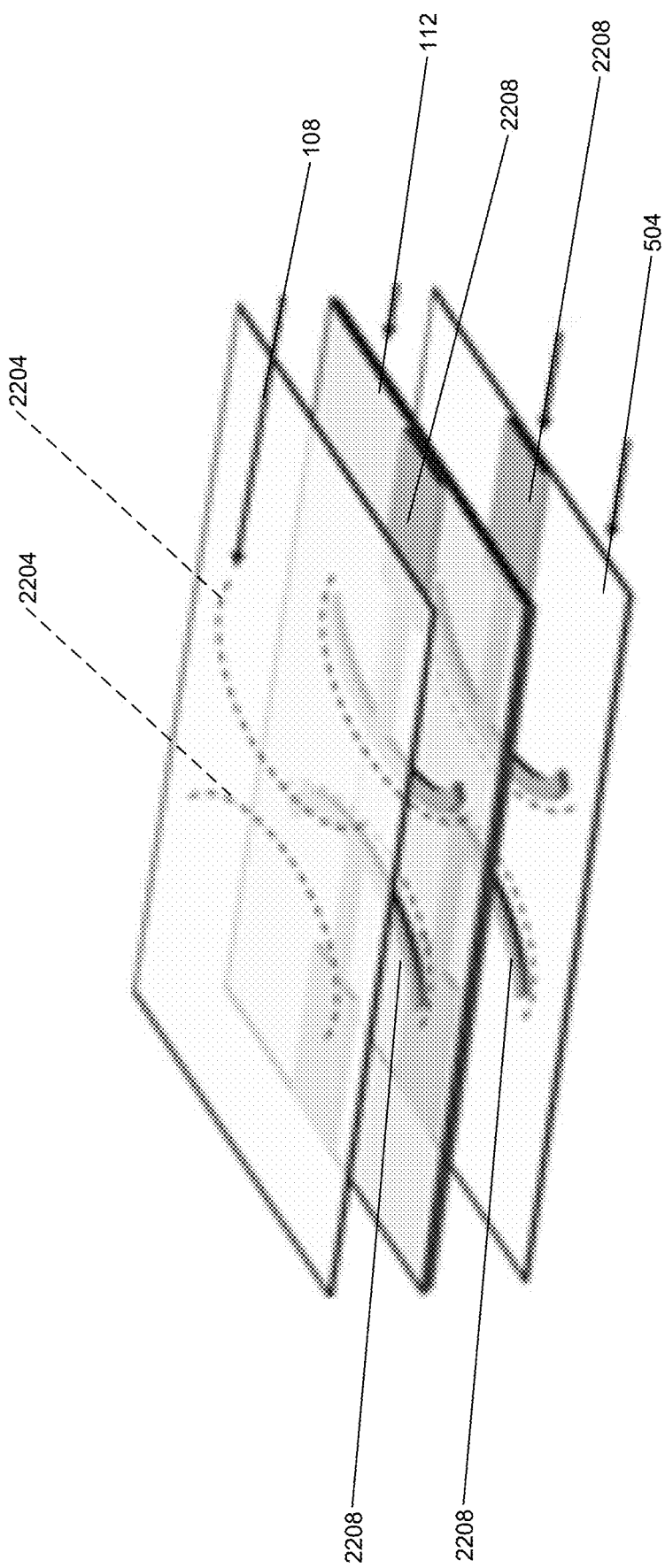
FIG. 25 is an exploded view of an example three layer masked bladder.
Figure 26:
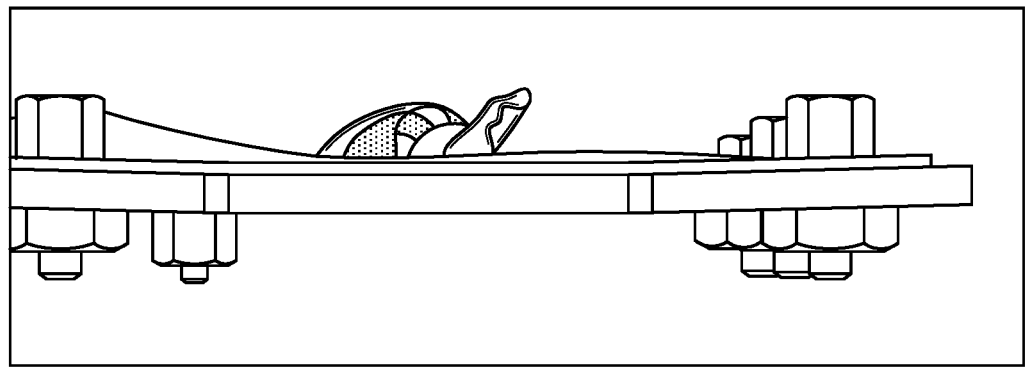
FIG. 26 is an example side view of the bladder of FIG. 25 with the gills actuating in one direction.
Figure 27:
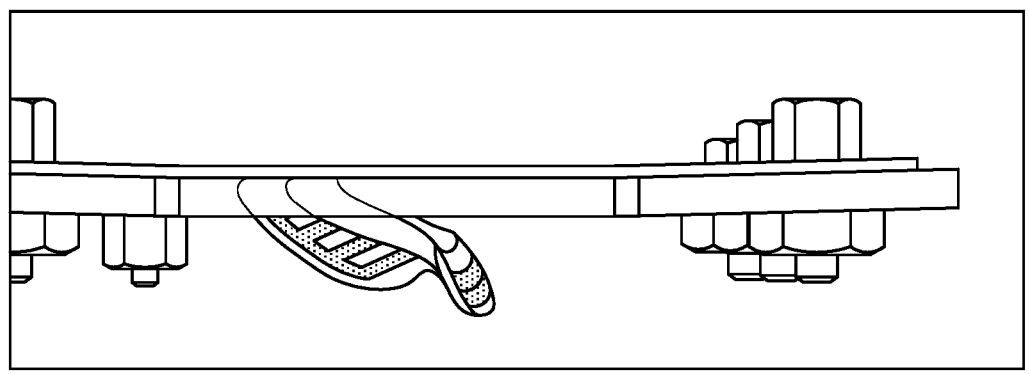
FIG. 27 is an example side view of the bladder of FIG. 25 with the gills actuating in another direction.

While FIGS. 21-23 illustrate an example of a two layer bladder, the present application is also applicable to greater than two layer bladders, for example, to provide two directional actuation of the gills. For example, FIG. 25 is an exploded view of an example three layer masked bladder. The slits 2204 being provided in more than two membranes may enable actuation in two directions. In this example, the slits 2204 are provided through all three membranes. FIG. 26 is an example side view of the multi-layer bladder of FIG. 25 with the gills actuating in one direction. FIG. 27 is an example side view of the multi-layer bladder of FIG. 25 with the gills actuating in another direction.

In various implementations, the mask may include a plurality of perforations. The perforations may help distribute air more evenly within the bladder and may provide an aesthetic appearance of the bladder, such as when the bladder is located on a visible surface. For example, a bladder with gills may be located on a dashboard of a vehicle, where the gills serve as conduits through which heated and cooled air from a heating ventilation and air conditioning (HVAC) system can flow (when a gill is open) or be blocked (when the gill is closed).

FIG. 28 includes a perspective view of an example mask 2804 with perforations (apertures) 2808 where the material of the mask is removed. The membranes above and below the mask 2804 will be sealed to each other within the perforations 2808. While the example of circular perforations is shown in FIG. 28, non-circular perforations of other shapes could be used, such as ovular, hexagonal, octagonal, square, rectangular, or triangular. Examples of other shapes of perforations are provided on the bottom of FIG. 28. The present application, however, is also applicable to other shapes of perforations.

Figure 29:
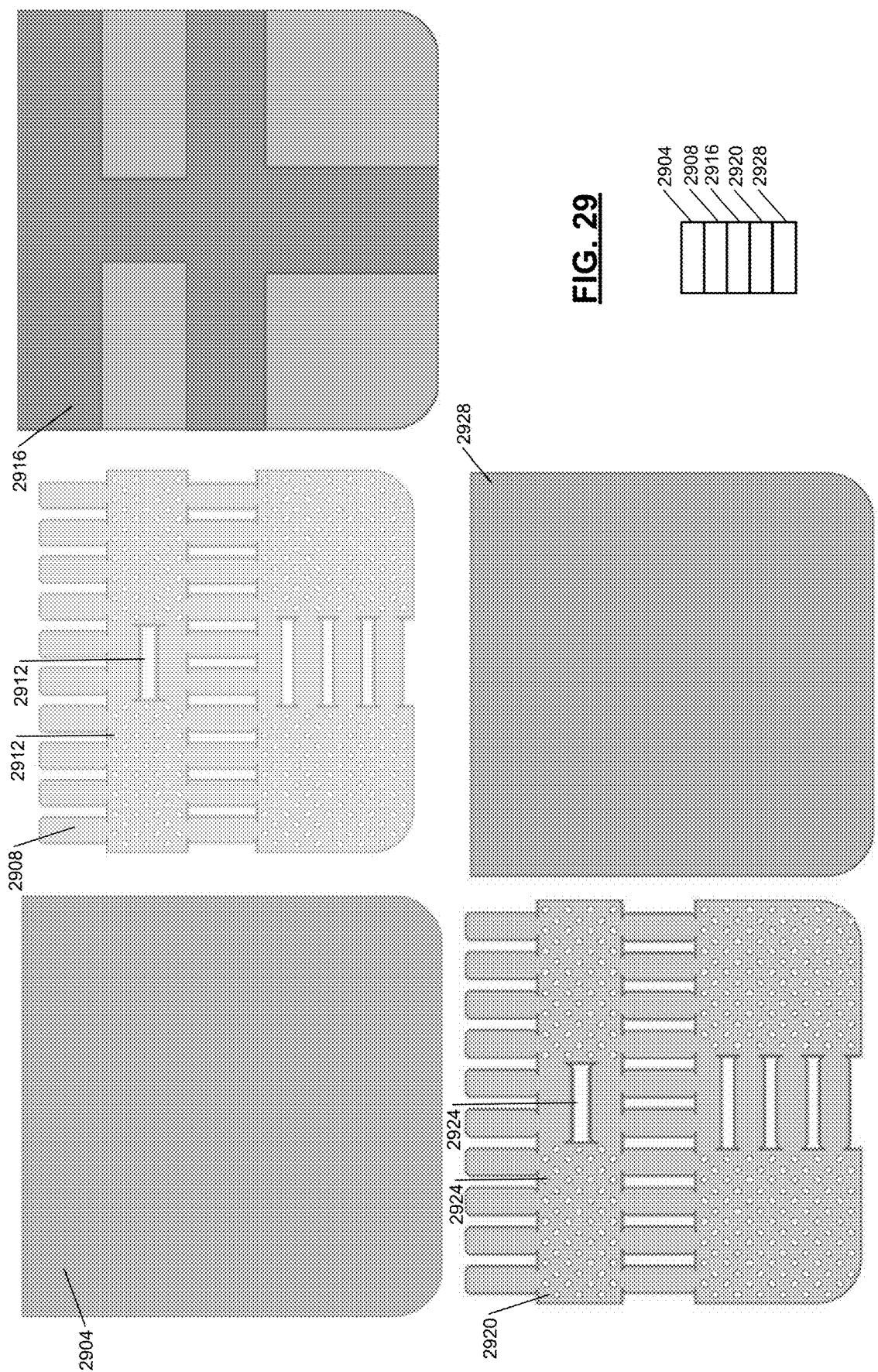
FIG. 29 is an example top view of layers of a masked bladder of a seatback pocket.

Masks with perforations can be used, for example, in conjunction with the seatback pocket implementation discussed above. FIG. 29 is an example top view of layers of a masked bladder of a seatback pocket. 2904 is a first membrane. 2908 is a first mask including example perforations 2912. 2916 is a second membrane, such as a more resilient (e.g., thicker) structural membrane. 2916 may be, for example, a plate of the membrane material or a film with plate-like regions where the film is thicker than other thinner regions. The first mask 2908 is sandwiched between the first membrane 2904 and the second membrane 2916. The first membrane 2904 and the second membrane 2916 are sealed to each other at locations where the first mask 2908 is not present (including within the perforations 2912). The locations where the first and second membranes 2904 and 2916 are sealed together form structures similar to rivets or columns.

Figure 35:
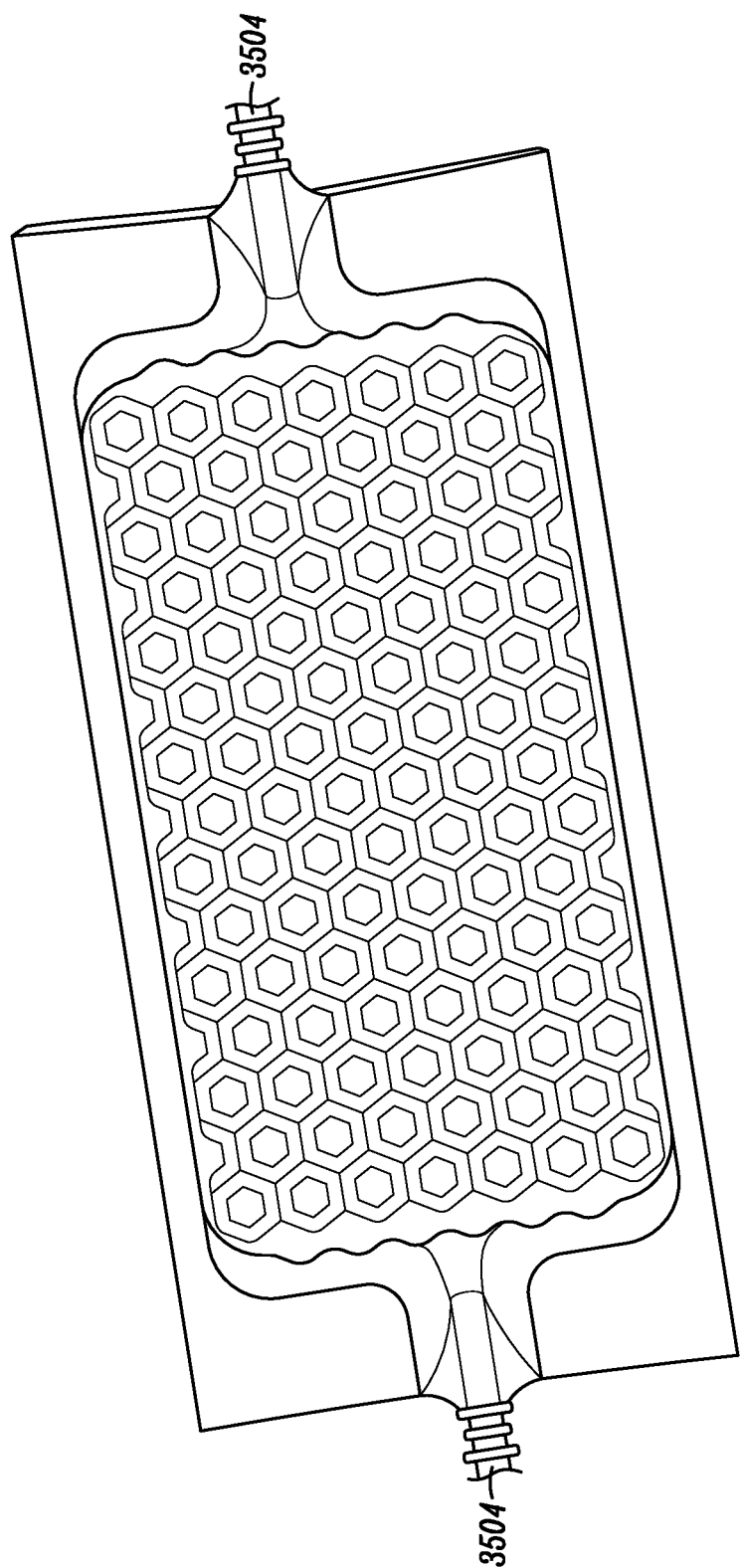
FIG. 35 includes a perspective view of a multi-layer bladder having a mask with a plurality of perforations FIG. 36 includes a cross-sectional view of a portion of a multi-layer bladder including a fluid channel within a membrane to allow fluid flow through the membrane.

2920 is a second mask including example perforations 2924. The second mask 2920 may be identical to the first mask 2908 and have the same perforations as the first mask 2908. 2928 is a third membrane. The third membrane 2928 may be identical to the first membrane 2904. The second mask 2920 is sandwiched between the second membrane 2916 and the third membrane 2928. The third membrane 2928 and the second membrane 2916 are sealed to each other at locations where the second mask 2920 is not present (including within the perforations 2924). The locations where the third and second membranes 2928 and 2916 are sealed together form structures similar to rivets or columns. A cross-sectional view of the example of FIG. 29 is provided at the bottom right of FIG. 29. FIG. 35 includes a perspective view of an example multi-layer bladder where the mask includes perforations. In the example of FIG. 35, the multi-layer bladder also includes two fluid channels 3504.

Figure 30:
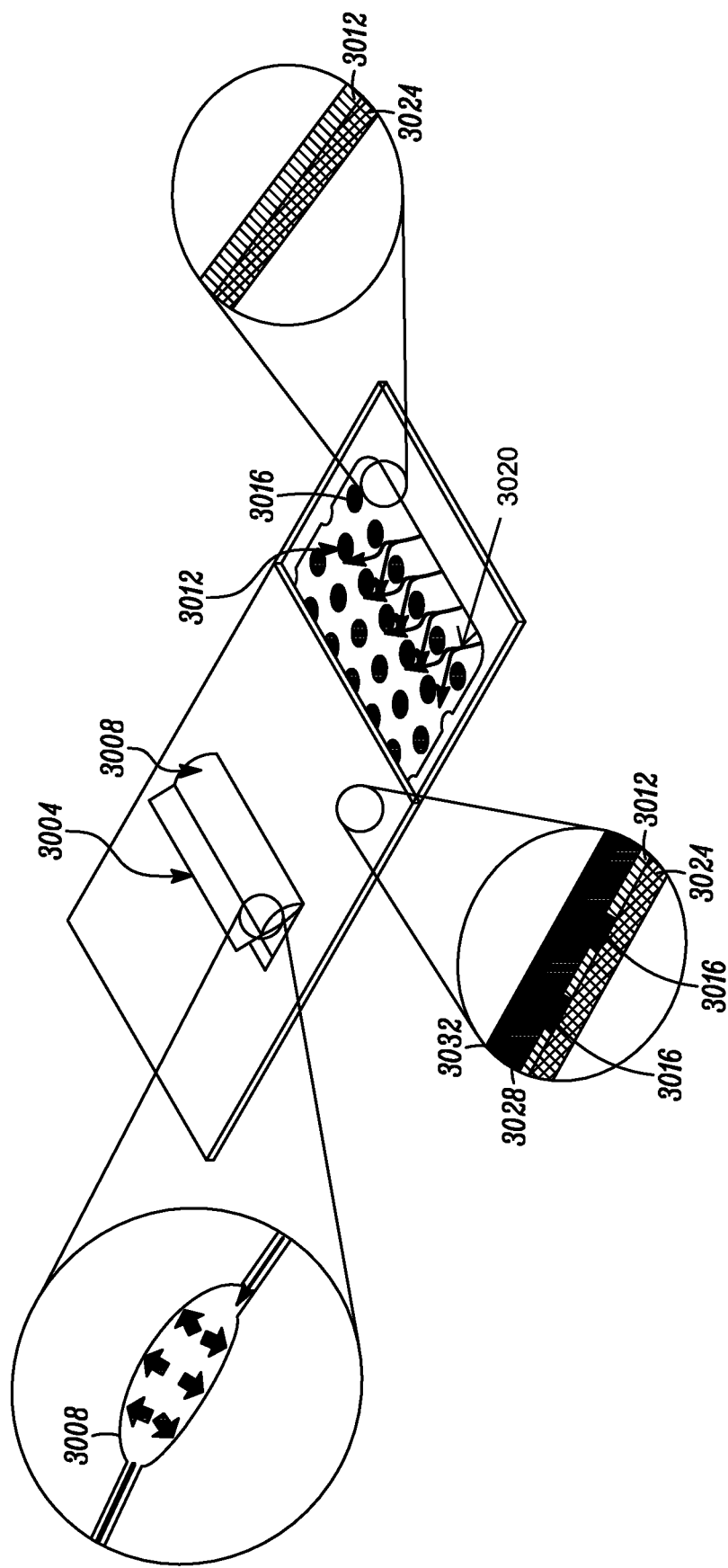
FIG. 30 is a perspective view of an example implementation of a multi-layer bladder including a gill.

Masks with perforations can be used, for example, with bladders having one or more gills. FIG. 30 is a perspective view of an example implementation of a multi-layer bladder including a gill 3004. The gill 3004 includes a bladder 3008 that opens the gill 3004 when the bladder 3008 is inflated. The gill 3004 closes when the bladder 3008 is not inflated. A cross-sectional view of the gill 3004 including the bladder 3008 is provided at left on FIG. 30.

The bladder of FIG. 30 also includes a mask 3012 including perforations (apertures) 3016. The mask 3012 including the perforations 3016 helps distribute airflow throughout the bladder, as illustrated by 3020, such as to the gill 3004 and other gills. The mask 3012 may include, for example, glassine or another suitable masking material.

In general the bladder layers can be made from thin membranes of thermoplastic material, allowing for bonding to adjacent layers of material (i.e. polypropelene, TPU, polyethelene, etc,). These layers can also be reinforced with a textile (knit or weave materials, or unidirectional yarn/ string elements) which is either coated or impregnated with the thermoplastic material. Additionally, the thickness of the material layer can be changed or the layer constituent material can be changed so the stiffness varies across the bladder layup. This layered stiffness gradient within the bladder system gives rise to curvature changes and shape changes when one or more of the cavities in the bladders are inflated.

A cross-sectional view of the bladder is provided at bottom in FIG. 30. The mask 3012 is sandwiched between a first membrane (e.g., TPU) 3024 and a second membrane (e.g., nylon textile (e.g., fabric) coated with TPU) 3028. The bladder may also include a third membrane 3032 (e.g., TPU), and a second mask (e.g., 3104 in FIG. 31) may be sandwiched between the third membrane 3032 and the second membrane 3028 to form the bladder 3008 and have perforations similar or identical to the mask 3012. Membranes and plates may be referred to more generally as bladder layers.

The perforations may be equidistant from each other, such as illustrated in FIG. 30. The perforations may follow an offset pattern where the centers of the perforations of every other row are aligned (e.g., FIG. 30) or a non-offset pattern where the centers of the perforations of every row are aligned in two directions (e.g., FIG. 28).

Figure 31:
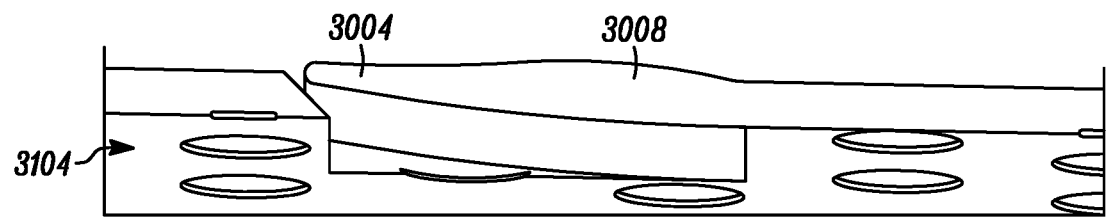
FIG. 31 is a cross-sectional view of the example bladder of FIG. 30 with the gill closed due to the bladder not being inflated.
Figure 32:
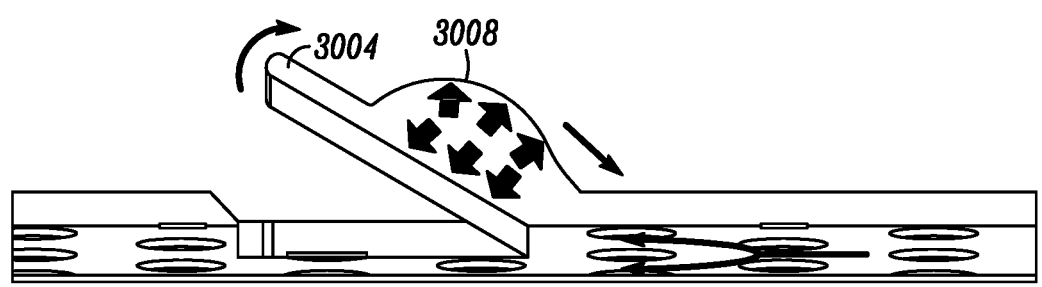
FIG. 32 is a cross-sectional view of the example bladder of FIG. 30 with the gill open due to the bladder being inflated.

FIG. 31 is a cross-sectional view of the example bladder of FIG. 30 with the gill 3004 closed due to the bladder 3008 not being inflated. FIG. 32 is a cross-sectional view of the example bladder of FIG. 30 with the gill 3004 open due to the bladder 3008 being inflated.

Figure 33:
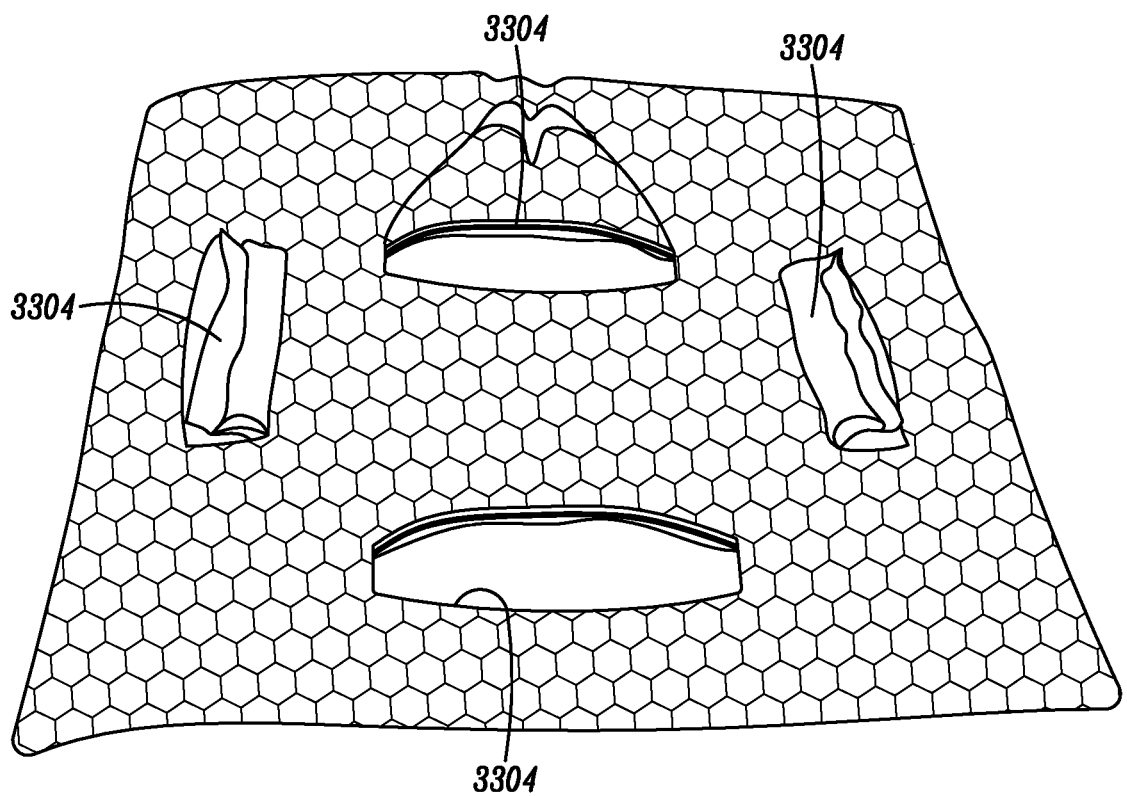
FIG. 33 is a perspective view of an example multi-layer bladder including multiple gills.

FIG. 33 is a perspective view of an example multi-layer bladder including multiple gills 3304. The bladder of FIG. 33 also includes a mask having perforations as illustrated by the dimpling in the outer layer of the bladder.

Figure 34:
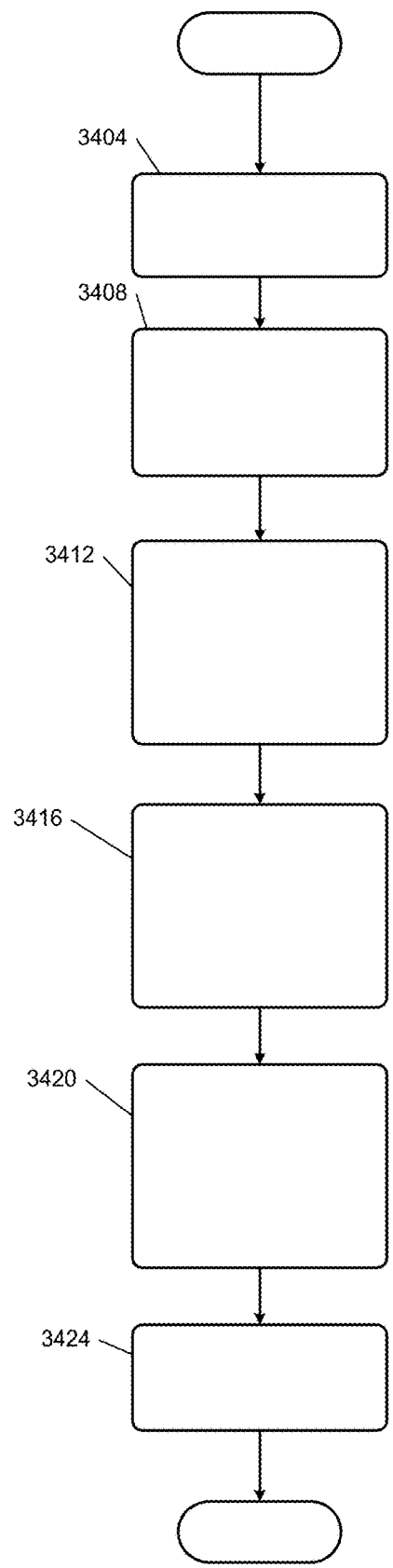
FIG. 34 is a flowchart depicting an example method of manufacturing a masked bladder with gills and masks with perforations.

FIG. 34 is a flowchart depicting an example method of manufacturing a masked bladder with gills and masks with perforations. The method begins with 3404 where the first membrane (e.g., TPU), the second membrane (e.g., nylon), the third membrane (e.g., TPU), and the first and second masks (e.g., glassine) are prepared. The masks and the membranes may, for example, be cut to predetermined dimensions and to have a predetermined shape. The masks are cut to include perforations. The membranes and the masks may be cut, for example, using an automated cutting machine or in another suitable manner.

At 3408, the first mask may be positioned on top of the first membrane. The second membrane is positioned on top of the first mask such that the first mask is sandwiched between the first membrane and the second membrane.

At 3412, the first membrane, the second membrane, and the first mask are positioned on a heat press. The heat press is closed to apply pressure and heat to the first membrane, the second membrane, and the mask. The first membrane, the second membrane, and the mask may be heated at a predetermined temperature for a predetermined period using the heat press. The predetermined temperature and the predetermined period may be set, for example, based on being sufficient to bond the first membrane to the second membrane. For example only, the predetermined temperature may be approximately 270 degrees F. to approximately 330 degrees F., and the predetermined period may be 45 seconds to 2 minutes using the example materials above. Other temperatures and/or periods may be used for different materials and or materials of different characteristics. The heating and the pressure bond (seal) the first membrane and the second membrane including within the perforations of the first mask.

At 3416, the second mask may be positioned on top of the second membrane. The third membrane is positioned on top of the second mask such that the second mask is sandwiched between the third membrane and the second membrane.

At 3420, the first membrane, the second membrane, the third membrane, the first mask, and the second mask are positioned on the heat press. The heat press is closed to apply pressure and heat to the third membrane and the second membrane. The third membrane and the second membrane may be heated at a predetermined temperature for a predetermined period using the heat press. The predetermined temperature and the predetermined period may be set, for example, based on being sufficient to bond the third membrane to the second membrane. For example only, the predetermined temperature may be approximately 270 degrees F. to approximately 330 degrees F., and the predetermined period may be 45 seconds to 2 minutes using the example materials above. Other temperatures and/or periods may be used for different materials and or materials of different characteristics. The heating and the pressure bond (seal) the third membrane and the second membrane including within the perforations of the second mask.

At 3424, one or more inlets (e.g., tubes) may be inserted. For example, an inlet may be inserted between the second and third membranes to inflate the gills and to actuate the gills in a first direction. Additionally, an inlet may be inserted between the first and second membranes, for example, to actuate the gills in a second direction.

Figure 36:
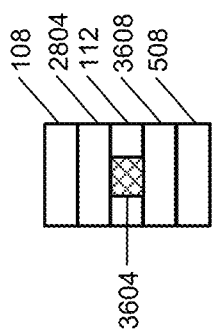

In various implementations, a membrane may include one or more fluid channels through the membrane to allow fluid flow from one side of the membrane to the other side of the membrane. For example, FIG. 36 includes a cross-sectional view of a portion of multi-layer bladder where the second membrane 112 includes one or more fluid channels (e.g., tubes or apertures), such as fluid channel 3604. The mask located between the first and second membranes 108 and 112 may include a plurality of perforations, such as the mask 2804. The mask 3608 located between the second membrane 112 and the third membrane 508 may include perforations (e.g., like the mask 2804) or not include perforations, such as the masks of FIGS. 1-27). The third membrane 508 may include one or more features, such as one or more slits or one or more gills. The fluid channel(s) through the second membrane 112 allow fluid flow from between the first and second membranes 108 and 112, through the fluid channel(s), and to between the second and third membranes 108 and 112.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A multi-layer bladder comprising:
   a first bladder layer;
   a mask including a plurality of apertures,
   wherein the apertures are equidistant from each other, circular, and the same size;
   a second bladder layer bonded to the first bladder layer within the apertures in the mask and where the mask is not present between the first and second bladder layers,
   wherein the mask is configured to prevent bonding of the second bladder layer to the first bladder layer where the mask is present; and
   a fluid channel that is located between the first and second bladder layers and that extends to the mask from an outer edge of the multi-layer bladder.

2. The multi-layer bladder of claim 1 wherein the apertures are on one the same plane.

3. The multi-layer bladder of claim 1 further comprising a slit through the first and second bladder layers, wherein the multi-layer bladder is sealed along the slit, and wherein a portion of the mask is proximate to the slit.

4. The multi-layer bladder of claim 1 does not include any slits through the first and second bladder layers.

5. The multi-layer bladder of claim 1 wherein the first and second bladder layers include polypropylene.

6. The multi-layer bladder of claim 1 wherein the first and second bladder layers include thermoplastic polyurethane (TPU).

7. The multi-layer bladder of claim 1 wherein the mask includes a paper.

8. The multi-layer bladder of claim 1 wherein the mask includes glassine.

9. The multi-layer bladder of claim 1 wherein at least a portion of the second bladder layer is more resilient than the first bladder layer.

10. The multi-layer bladder of claim 1 further comprising:
    a second mask; and
    a third bladder layer bonded to the second bladder layer where the second mask is not present between the third and second bladder layers,
    wherein the second mask is configured to prevent bonding of the second bladder layer to the third bladder layer where the second mask is present.

11. The multi-layer bladder of claim 10 wherein the second bladder layer comprises at least gas channel that allows fluid flow from between the first and second bladder layers to between the second and third bladder layers.

12. The multi-layer bladder of claim 10 further comprising a second fluid channel that is located between the second and third bladder layers and that extends to the second mask from the outer edge of the multi-layer bladder.

13. A seatback pocket including the multi-layer bladder of claim 1.

14. The seatback pocket of claim 13 wherein the multi-layer bladder further includes:
    a second mask; and
    a third bladder layer bonded to the second bladder layer where the second mask is not present between the third and second bladder layers, wherein the second mask is configured to prevent bonding of the second bladder layer to the third bladder layer where the second mask is present.

15. The seatback pocket of claim 13 further comprising: a second multi-layer bladder that is arranged perpendicular to the multi-layer bladder.

16. The seatback pocket of claim 13 further comprising an extensible fabric that covers the multi-layer bladder.

17. The seatback pocket of claim 13 further comprising a first tab at a first distal end of the multi-layer bladder and a second tab at a second distal end of the multi-layer bladder, wherein the first distal end is opposite the second distal end, and
wherein the first and second tabs are at least partially disposed within channels in the seatback.

18. A method of manufacturing a multi-layer bladder, the method comprising:

disposing a mask on a first bladder layer;
disposing a second bladder layer over the mask and the first bladder layer,
wherein the mask includes a plurality of apertures and is configured to prevent bonding of the second bladder layer to the first bladder layer where the mask is present, and
wherein the apertures are equidistant from each other, circular, and the same size; and
using a heat press, applying pressure and heating the first bladder layer, second bladder layer, and the mask within in a predetermined temperature range for at least a predetermined period, thereby bonding the first bladder layer with the second bladder layer within the apertures and at locations where the mask is not present between the first and second bladder layers.

* * * * *